Feb. 10, 1970   N. L. MOORE   3,494,261
LUBRICANT ISOLATING BAFFLE
Filed Nov. 6, 1967
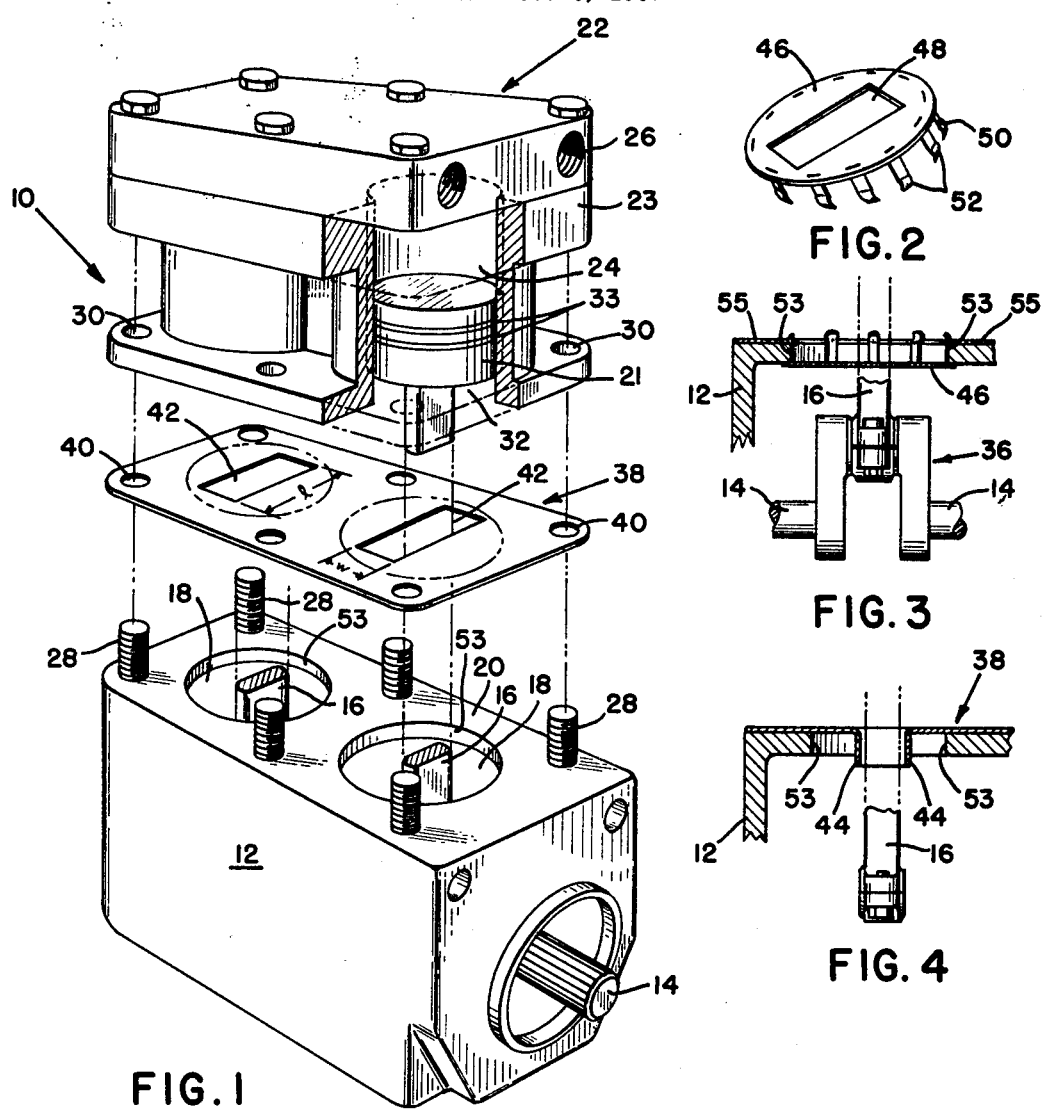
*INVENTOR.*
NORMAN L. MOORE _United States Patent Office_

3,494,261
Patented Feb. 10, 1970

3,494,261
LUBRICANT ISOLATING BAFFLE
Norman L. Moore, 2512 Freeman St.,
Winston-Salem, N.C. 27107
Filed Nov. 6, 1967, Ser. No. 680,867
Int. Cl. F04b 25/00, 39/04
U.S. Cl. 92—153                              3 Claims

ABSTRACT OF THE DISCLOSURE

A removable baffle positioned between the upper crankcase wall and the air compressor head of an air pressure generating system substantially covered openings in the upper wall corresponding with the compressor cylinder chambers while allowing the piston connecting rods to extend reciprocally between the compressor and the crankcase, the baffle limiting the passage of lubricant from the crankcase to the cylinder and compressor chambers to prevent lubricant collection in the air lines and reservoir.

BACKGROUND, BRIEF SUMMARY AND OBJECTIVES OF THE INVENTION

In instances where a supply of compressed air is required, particularly in the brake and air-conditioning systems of large referigerated transport trucks, operational difficulties with the air supply system are often encountered because lubrication of the main compressor drive shaft bearings as well as the connecting rod and cross-head bearings by means of a conventional splash system will cause the lubricant to enter the compression chamber and be introduced into the communicating high pressure air lines normally extending to the air reservoir from the compressor. Introduction of lubricant into the lines and reservoir will have an immediate detrimental effect on the operation of the various air-controlled components and will eventually result in the damage to these components if not corrected.

The conventional construction of a compressed air generator such as a pump or a compressor for use in motor vehicles and the like includes an oil-containing crankcase housing surrounding a rotatable drive shaft which connects, within the housing, to the connecting rods of one or more compressor pistons. The rotatable drive shaft may be an extension of the engine crankshaft or may be one of numerous auxiliary shafts secured to the crankshaft. The crankcase housing upper wall has a number of piston-receiving openings corresponding to the number of pistons used in the compressor, and these openings are covered by a compressor head having one or more piston or cylinder chambers corresponding with the openings and communicating with the compressor chamber. High pressure air lines connect the compressor chamber to the air reservoir which supplies air under pressure for the operation and control of the air-powered or air-actuated devices of the system.

The present improvement serve to limit substantially the displacement of turbulent lubricating oil agitated within the crank case by the rotating drive shaft and joined piston connecting rods to the cylinder and compressor chambers and eventually to the high pressure air lines communicating with the air reservoir. The invention includes generally a removable baffle or plate positioned between the upper crankcase housing wall and the compressor head to reduce substantially the size of the interconnecting upper wall openings between the crankcase and the cylinder chambers so that lubricant agitated by movement of the mechanically linked drive shaft and piston connecting rods within the crankcase will be deflected by the baffle and retained within the crankcase. The only openings within the baffle are slotted rectangular apertures sufficient in size to accommodate the reciprocating piston connecting rods extending from the drive shaft in the crankcase to the pistons in the cylinder chambers.

Accordingly, it is an object of the present invention to provide means for substantially eliminating the displacement of oil agitated and splashed by movement of the linked drive shaft and piston connecting rods in the crankcase housing to the cylinder and compressor chambers of the air compressor and the air lines and reservoir of the compressed air system.

Another object of the present invention is to provide a baffle of the type described which will essentially eliminate the opening between the crankcase and cylinder chambers except for apertures sufficient in size to accommodate the reciprocating piston connecting rods.

A further object of the present invention is to provide a baffle of the type described which may be replaced periodically if needed to insure proper operation of the lubricated air-generating apparatus and avoid passage of lubricant into the high pressure air lines of the system.

Yet still a further object of the present invention is to provide an alternative embodiment of a baffle which may be snapped into the opening in the upper wall of the crankcase from the inside of the crankcase so that the overlapping baffle effectively limits the passage of oil splashed or agitated within the crankcase by movement of the linked crankshaft and piston connecting rods.

Yet still another feature object of the present invention is to provide a further embodiment of a lubricant baffle of the type described having connecting rod-receiving apertures with downwardly extending edges sufficient to limit passage of splashed lubricant from the crankcase into the cylinder chamber.

These and other objects of the present invention will become more apparent after a consideration of the following detailed description taken in conjunction with the accompanying drawings in which like characters of reference designate like parts throughout the several views.

DRAWING DESCRIPTION

FIG. 1 is a perspective, exploded and partial sectional view of a crankcase and compressor head separated to accommodate a replaceable gasekt baffle therebetween which limits the size of the openings between the crankcase and the cylinder chambers.

FIG. 2 is an alternative embodiment of a replaceable baffle for substantially closing each opening, the upper wall of the crankcase housing having a plurality of resilient biasing prongs or pins adapted to retain the baffle securely over an opening.

FIG. 3 is an end elevational, partial sectional, and fragmentary view of the upper crankcase wall and the alternative embodiment of baffle plate shown in FIG. 2 secured over the opening communicating with a cylinder chamber above.

FIG. 4 is an end elevational, partial sectional, and fragmentary view of another embodiment of an integral baffle plate showing outwardly extending edges along the connecting rod aperture which offer further opposition to the passage of oil from the crankcase through the upper crankcase wall opening into the cylinder chamber.

DETAILED DESCRIPTION OF THE INVENTION

Referring now to the drawings and particularly to FIG. 1, a lubricated, compressed air generator generally designated 10 comprises a crankcase 12 within which is housed a crankshaft 14 extending directly from the drive shaft or from an auxiliary shaft communicating therewith (not shown). The crankcase 12 contains a quantity of lubricant such as oil or the like maintained at a level which will at least partially cover a plurality of piston connecting rods 16 secured to the shaft 14 in a conventional manner such as that illustrated in FIG. 3. The connecting rods 16 extend upwardly through openings 18 in the upper crankcase wall 20 to connect with pistons 21 for reciprocal movement upon rotation of the crankshaft 14.

A compressor head, shown generally as 22, comprises a block 23 having a number of cylinder chambers 24 formed therein communicating with a compression chamber (not shown) in the upper portion of the head 22 having openings 26 which connect with the high pressure air lines (not shown) leading to the air reservoir (not shown). A plurality of threaded dowels or studs 28 are positioned selectively to engage head 22 through a plurality of aligned openings 30 so that the lower portion 32 of each cylinder chamber 24 is in alignment with an aperture 18 in the crankcase upper wall 20. The connecting rods 16 of pistons 21 reciprocate both vertically and horizontally as shaft 14 rotates due to the conventional U-shaped connector 36 (see FIG. 3) used to secure the rod 16 to the shaft 14. As the shaft 14, connecting rods 36 and connectors 36, are displaced, the oil or lubricant (not shown) contained within the crankcase housing 12 is agitated or splashed upwardly, and during conventional operation, the lubricant will be introduced into the lower portions 32 of cylinder chambers 24 so that the constant motion of the pistons 21 up and down within the chambers will allow the gradual passage of oil between the cylinder walls and the pistons. The introduction of oil will increase as the piston rings 33 become worn so that oil is eventually passed into the compressor chamber and connecting air lines. Obviously, the introduction of oil in that chamber is likely to cause a malfunctioning of the apparatus since it will be urged outwardly through openings 26 into the high pressure air lines and onto the air reservoir.

To prevent the movement of lubricant into the lower portion 32 of cylinder chamber 24, it has been found advantageous to replace the customary gasket with a removable baffle indicated generally as 38 conforming substantially in shape to the upper wall 20 of crankcase 12 which can be held in place by a suitable number of apertures 40 receiving threaded dowels or studs 28. The baffle 38 may be made of any convenient oil resistant material such as neoprene, plastic, metal or suitable gasket material, and the baffle may be replaced if needed by merely removing the stud-securing means (not shown) and separating the head 22 from the crankcase 12.

The baffle 38 is fashioned to cover substantially the openings 18 in the crankcase upper wall 20 interconnecting the crankcase 12 with the cylinder chamber lower portions 32, and it is provided with one or more connecting rod receiving slots 42 which receive each connecting rod 16 extending from the crankshaft 14 to the piston 21 in each of the cylinder chambers 24. Each slot is of a predetermined width w conforming substantially to the width of the connecting rod 16 and has a length l sufficient to accommodate the width of rod 16 and its oscillatory movement between limits (horizontal displacement of the rod because of its reciprocation) as the piston is moved up and down by the rotating crankshaft 14. Thus the openings 18 interconnecting the crankcase interior with the cylinder chambers 24 is significantly diminished to the extent that only apertures of sufficient size to accommodate the piston connecting rods 16 remain, and this reduction substantially reduces or controls, to a great extent, the passage of lubricant from the interior of the crankcase 12 into the bottom portion 32 of the cylinder chamber 24, a process which consistently results in the introduction of lubricant into the high pressure air lines and maintenance and operational problems with the compressed air system components.

It has been found advantageous to provide, in some instances, depending legs or skirts 44 (FIG. 4) along the sides of the slots 42 which extend inwardly of the crankcase 12 and substantially parallel to the connecting rods 16. These depending legs 44 form a shield and provide additional insurance against the passage of agitated or splashed lubricant from the crankcase into the cylinder chambers.

Numerous embodiments of the disclosed baffle constituting the present invention may be provided, one such alternative embodiment being best illustrated in FIG. 2 and comprising a circular plate 46 adapted to reduce a single upper crankcase wall opening 18 having the piston rod receiving slot 48 suitably disposed in the plate to receive the connecting rod. A number of resilient pins or clips 50 having a slightly curved extending tip 52 are positioned in spaced-apart relationship generally about the periphery of the plate 46. The individual plates 46 are then fitted into each of the openings 16 in the manner illustrated in FIG. 3 so that the clips 50 are biased against the crankcase upper wall edges 53 and thus retain the plate 46 in proper position. It will be noted that a conventional gasket 55 is placed on the upper crankcase wall 20 while the plates 46 are mounted from inside the crankcase so that there is little danger of the splashed or agitated lubricant displacing the plate from its selected location.

While there have been described several embodiments of a removable and replaceable baffle for precluding the passage of lubricant from the crankcase interior to the compression chamber of a compressed air generating device, it will be obvious that many modifications and variations may be made in the structure and configuration of the baffle including the connecting rod apertures and securing means as well as other phases of the present inventive concept without departing from the spirit and purpose of the invention, and such modifications including the use of equivalents are contemplated.

I claim:

1. In a lubricated compressed air apparatus having a lubricant-containing crankcase housing a rotatable crankshaft driving the connecting rods of a plurality of pistons, the upper wall of the crankcase having a number of rod-receiving openings corresponding to the number of pistons used, and a compressor head having cylinder and compression chambers interconnected with the crankcase through said rod-receiving openings, the improvement for substantially isolating the crankcase lubricant and deterring lubricant displacement from the crankcase through the rod-receiving openings, the cylinder chambers and into the compressor chamber as lubricant is agitated and splashed within the crankcase by movement of the linked crankshaft and connecting rods, said improvement comprising: a single flat substantially rigid baffle removably positioned between the upper wall of the crankcase and the compressor head and shaped to cover substantially the entire rod-receiving openings in the crankcase upper wall interconnecting the crankcase and the cylinder chambers, said baffle having a plurality of connecting rod-receiving slots each of said slots receiving a connecting rod extending from the crankshaft in the crankcase to the piston in each of the cylinder chambers.

2. The improvement as claimed in claim 1, said baffle conforming in shape substantially to the upper wall of said crankcase and the compressor head, retaining means including a plurality of studs disposed on said crankcase upper wall for releasably securing said crankcase head to said crankcase, each of said slots conforming substantially to the width of a rod and of a length sufficient to accommodate the rod in its oscillatory movement for each connecting rod extending from the crankshaft to the piston in each of the cylinder chambers, said baffle having a plurality of openings therein for receiving said studs therethrough.

3. In a lubricated compressed air apparatus having a lubricant containing crankcase housing a rotatable crankshaft driving the connecting rods of at least one piston, the upper wall of the crankcase having a number of rod-receiving openings corresponding to the number of pistons used, and a compressor head having cylinder and compression chambers interconnected with the crankcase through said rod-receiving openings, the improvement for substantially isolating the crankcase lubricant and deterring lubricant displacement from the crankcase through the rod-receiving openings, the cylinder chambers and into the compressor chamber as lubricant is agitated and splashed within the crankcase by movement of the crankshaft and connecting rods, said improvement comprising: at least one baffle removably positioned between the upper wall of the crankcase and the compressor head and shaped to cover substantially the entire rod-receiving openings in the crankcase upper wall interconnecting the crankcase and the cylinder chambers, said at least one baffle having a connecting rod-receiving slot receiving a connecting rod extending from the crankshaft in the crankcase to the piston in each of the cylinder chambers, said at least one baffle comprising a circular plate, said circular plate having retaining means including a plurality of flexible clips suitably disposed along the periphery of each circular plate and adapted to fit over an opening in the upper crankcase wall from within the crankcase, to engage releasably the corresponding crankcase upper wall opening.

References Cited

UNITED STATES PATENTS

| | | | |
|---|---|---|---|
| 970,487 | 9/1910 | Gardner | 230—172 X |
| 1,324,894 | 12/1919 | Hauser | 92—141 X |
| 1,505,976 | 8/1924 | Spohrer | 230—172 X |
| 2,176,691 | 10/1939 | Simons | 92—153 X |
| 2,556,273 | 6/1951 | Hedges | 92—73 X |
| 2,857,219 | 10/1958 | Griffith et al. | 92—141 |
| 2,915,241 | 12/1959 | Stenger | 230—172 |

MARTIN P. SCHWADRON, Primary Examiner

I. C. COHEN, Assistant Examiner

U.S. Cl. X.R.

92—261; 230—172, 184